United States Patent [19]
Hashimoto

[11] Patent Number: 5,410,455
[45] Date of Patent: Apr. 25, 1995

[54] REAR WINDOW WITH AN ALARM LAMP FOR A VEHICLE

[75] Inventor: Hideyuki Hashimoto, Taketoyo, Japan

[73] Assignee: Asahi Glass Company Ltd., Tokyo, Japan

[21] Appl. No.: 221,260

[22] Filed: Mar. 31, 1994

[30] Foreign Application Priority Data

Apr. 2, 1993 [JP] Japan .................................. 5-098341

[51] Int. Cl.⁶ ............................................. B60Q 1/44
[52] U.S. Cl. .................... 362/80.1; 362/368; 340/479
[58] Field of Search .............. 362/61, 80.1, 80, 368, 362/382; 340/479

[56] References Cited
U.S. PATENT DOCUMENTS

| | | | |
|---|---|---|---|
| 4,733,335 | 3/1988 | Serizawa et al. | |
| 4,851,970 | 7/1989 | Bronder | 362/80.1 |
| 4,896,136 | 1/1990 | Hotovy | 362/80.1 |
| 4,993,774 | 2/1991 | Greenhalgh et al. | |

FOREIGN PATENT DOCUMENTS

| | | | |
|---|---|---|---|
| 2663274 | 12/1991 | France . | |
| 4-362432 | 12/1992 | Japan | 362/80.1 |
| 5-16727 | 1/1993 | Japan | 362/80.1 |

Primary Examiner—Richard R. Cole
Attorney, Agent, or Firm—Oblon, Spivak, McClelland, Maier & Neustadt

[57] ABSTRACT

A rear window structure with an alarm lamp for a vehicle has a gasket to be attached to a rear frame in a vehicle body, a rear window glass sheet, and a holder provided with a glass sheet fitting portion and an alarm lamp holding portion, wherein the holder is provided between the gasket and a peripheral edge portion of the glass sheet; the holder is firmly secured by fitting the glass sheet to the glass sheet fitting portion; the alarm lamp holding portion opens to the backward of the vehicle body; and an alarm lamp is held by the alarm lamp holding portion.

22 Claims, 2 Drawing Sheets

REAR WINDOW WITH AN ALARM LAMP FOR A VEHICLE

BACKGROUND OF THE INVENTION

Field of the Invention

The present invention relates to a rear window structure with an alarm lamp wherein a holding member holding an alarm lamp is interposed between a gasket attached to a rear frame of a vehicle body and a peripheral portion of a rear window glass sheet.

Discussion of the Background

As an alarm lamp for a vehicle, in particular, for an automobile, there are a stop lamp, a direction indicator and so on for informing information to the rear side. As the stop lamp, a pair of stop lamps are usually provided at right and left sides of the tail portion of a vehicle. Further, in order to make the recognition of the stop, the deceleration or the like of a vehicle easy to a driver in a succeeding vehicle during driving, it has been known to mount a stop lamp or stop lamps at a lower portion or an upper portion of a rear window of the vehicle. Further, it has been known to mount a stop lamp on the surface of a rear portion of the cover of the rear trunk, i.e. a trunk lid. Such a style of mounting is referred to as a high mount stop lamp (HMSL), which is commercially available.

In the HMSL in a style wherein a stop lamp is located at a lower portion or an upper portion of the rear window, there has been known to attach the stop lamp at the cabin side with respect to the rear window, namely, at the inside of the vehicle as proposed in, for instance, U.S. Pat. No. 4,993,774.

When the lamp is attached to the cabin side of the rear window, the attachment or removal of the stop lamp has to be conducted in a narrow space in the vehicle. Further, since the lamp has a certain volume, and there is an upper limit on the position of the lamp because of the rear edge portion of the vehicle roof, an effective space of the interior of the vehicle is narrow, and an eyesight to the backward and a view in the cabin are poor. Further, when the stop lamp is located at the cabin side, a light emitted from the lamp is caused to pass through the glass sheet of the rear window. Accordingly, the luminous intensity of the lamp has to be compensated because the effective luminous intensity is largely reduced.

Further a large current is needed at the time of turning on and off the lamp. In particular, the stop lamp and the direction indicator are frequently turned-on and off in the driving. Accordingly, a battery having a large capacity had to be provided, and power consumption of the battery is not negligible.

In a style wherein the stop lamp is mounted on the surface of the rear portion of the trunk lid, namely, the lamp is mounted at the outer side of the vehicle, the problem caused in a case that the lamp is attached at the cabin side of the vehicle does not take place. However, it is necessary to additionally provide an air spoiler to cover the stop lamp in order to prevent a wind pressure during the cruising, and an external force such as a shock by a pressure of brush at the time of washing the vehicle and atmospheric conditions such as wind and rain. The cost for providing the air spoiler is not negligible. Further, the provision of the air spoiler is not always satisfactory with respect to safeness (the air spoiler might be dropped during the driving) and the appearance of the vehicle.

In a conventional technique, the edge portion of the opening of a rear frame of a vehicle, especially, an automobile has been directly joined to a window material such as glass sheet, a plastic sheet or the like by using an adhesive at the edge portion of the opening of the rear frame of the automobile, or the edge portion of the opening of the rear frame is joined to the window material by interposing a gasket composed of rubber, a resilient plastic or the like. With respect to the later method of bonding the edge portion of the opening of the rear frame to the window material, the above-mentioned U.S. patent introduces an example that a stop lamp (HMSL) is attached to a gasket at an upper portion or a lower portion of a rear window at the inside of a vehicle. Namely, as shown in FIGS. 3 and 4 attached to this specification, when the HMSL is attached to the upper portion of the rear window at the inside of the vehicle, a lamp housing 16 is held between two brackets 19 which are extended downwardly with a space from an edge encapsulation member, i.e. the lamp housing 16 is attached to a gasket 18 itself made of a synthetic rubber-like plastic material. The lamp housing 16 is held by and secured to the gasket 18 by fitting projections 20 formed on both side walls of the lamp housing 16 to wedge-like recesses formed at an inner portions of the brackets 19 at positions corresponding to the projections 20. In FIG. 3 and 4, reference numeral 17 designates a glass sheet of rear window, numeral 21 designates a lens screen and numeral 22 designates a bulb.

The conventional rear window structure having the above-mentioned materials and the holding mechanism can only be satisfactory if the lamp housing 16 can be durable to vibrations caused in the driving and it is located at the cabin side free from an air resistance. In the conventional technique, the lamp housing 16 is supported by the gasket 18 made of a synthetic rubber-like plastic material. When the HMSL is attached to the outside of the rear window of the vehicle, the conventional rear window structure might not withstand to a strong wind pressure in the driving, and an external force such as a shock of the pressure of a brush at the time of washing the vehicle, and rain and wind. Accordingly, it is impossible for the conventional rear window structure to be provided at the outside of the vehicle. In this case, as described before, there are such problems of interfering a view of the backward of the vehicle, deteriorating the scene in the cabin and requiring a large luminous intensity for the lamp.

SUMMARY OF THE INVENTION

It is an object of the present invention to eliminate the disadvantages of the conventional technique described above, and to provide a rear window structure with an alarm lamp for a vehicle, which is durable to an external force even when an alarm lamp is mounted on the outside of the rear window of a vehicle.

The foregoing and other objects of the present invention have been attained by providing a rear window structure with an alarm lamp for a vehicle which comprises a gasket to be attached to a rear frame in a vehicle body, a rear window glass sheet, and a holding member provided with a glass sheet fitting portion and an alarm lamp holding portion, wherein the holding member is provided between the gasket and a peripheral portion of the glass sheet; the holding member is firmly secured by fitting the glass sheet to the glass sheet fitting portion;

the alarm lamp holding portion opens to the outside of the vehicle body; and an alarm lamp is held by the alarm lamp holding portion.

In the present invention, by mounting the alarm lamp at the outside of the vehicle with respect to the rear window, the attachment and removal of the alarm lamp can be easy in comparison with a case that the alarm lamp is attached to the cabin side of the rear window. Further, the scene of the cabin is not hindered; a view of the backward of the vehicle is improved; the effective space of the vehicle is widened, and the effective luminous intensity of the lamp can be effectively used without reducing the luminous intensity.

In the present invention, since the holding member provided with an alarm lamp holding portion opening to the outside of the vehicle and a glass sheet fitting portion, is interposed, as means for attaching the alarm lamp to the glass sheet of the rear window, between the glass sheet and the gasket, wherein the holding member is firmly secured by the glass sheet by fitting the glass sheet to the glass sheet fitting portion, and the alarm lamp is attached to the alarm lamp holding portion, a structure durable to a strong wind pressure during the driving and durable to an external force such as a shock by the pressure of a brush at the time of washing the vehicle and window and rain, can be provided.

The holding member comprises a band-like main body portion having a predetermined wall thickness, an upper band-like portion extending integrally from the rear surface side of the main body portion, an intermediate band-like portion and a lower band-like portion wherein a space formed between the upper band-like portion and the intermediate band-like portion is used, as a holding portion for the alarm lamp, so that the alarm lamp is received from the outside of the vehicle and held by the space, and a space between the intermediate band-like portion and the lower band-like portion is used, as a fitting portion, so that a peripheral portion of the glass plate is fitted to the space.

Fundamentally, the holding member has a fitting portion or a bonding portion to the glass sheet of the rear window so that the holding member is firmly secured to the glass sheet, and has a function to firmly holding the alarm lamp. Accordingly, the securing of the holding member to the glass sheet is performed by the fitting portion in the above-mentioned embodiment. However, the present invention is not limited to the above-mentioned embodiment. For instance, as the fitting portion of the holding member to the glass plate, a peripheral portion of the glass sheet with which the holding member is brought into contact may be used. An appropriate adhesive or the like is applied to the contacting portion previously so that the holding member is bonded to and secured by the glass sheet.

The shape of the gasket at a portion in contact with the front surface portion of the holding member should have a shape corresponding to the shape of the front surface portion of the holding member. When the holding member has such a shape as described above, the gasket should have recessed portions corresponding to each surface portion of the main body portion, the upper band-like portion and the lower band-like portion of the holding member.

The bonding of each corresponding portions of the glass sheet, and the gasket can be conducted in an appropriate order and with use of an appropriate adhesive or the like as required. In this case, however, the glass sheet, the gasket and the holding member have to be previously prepared regardless of the order of assembling. Further, it is desirable to form these elements in one-piece at the time of molding the gasket from the viewpoints of the bonding strength between the members, a sealing effect between the elements and convenience in shipping.

The rear surface side portion, i.e. the recessed portion of the gasket is in contact with the entire front surfaces of the main body portion and the upper band-like portion of the holding member. However, in the present invention, the gasket is not formed only to support and reinforce the holding member, but the upper portion of the gasket may be extended, as an extending portion, to be longer than the width of the upper band-like portion of the holding member, whereby the upper portion and the extending portion extending from the upper portion serve as an air spoiler. Namely, the upper portion and the extending portion of the gasket are adapted to adjust an air stream at the rear portion of the vehicle to reduce an air resistance and function to reduce the influence of a strong wind pressure or the like during the driving. As a result, a fuel cost for the vehicle can be reduced; the alarm lamp can be protected, and it is durable to a shock due to the pressure of a brush at the time of washing the vehicle and external atmospheric conditions.

Thus, the holding member is firmly secured by the glass sheet; receives therein the alarm lamp to firmly hold it, and support supplemetarily and reinforces the gasket. Therefore, the material of the holding member should have hardness, resiliency and strength sufficient to achieve the function described above, and should not be influenced by the material of the gasket. A known material such as plastics, fiber-reinforced plastics, metal or the like may be used as far as the materials have the above-mentioned properties.

As the alarm lamp, various types such as a circular tubular type, a bulb type, a plurality of circular tube-like alarm lamps or bulb-like alarm lamps received in a housing or a plurality of light-emitting diodes (LSD) received in a housing may be used. As to the number and arrangement of the alarm lamps used, one or a plurality of alarm lamps may be arranged at an appropriate position or positions of a peripheral portion of the window glass at the outside of the vehicle.

Further, as to the glass sheet, a glass sheet of inorganic series or organic series may be used for a rear window material.

DESCRIPTION OF THE DRAWINGS

A more complete appreciation of the present invention and the advantages thereof will become readily apparent from the following detailed description, particularly when considered in conjunction with the drawings in which.

DESCRIPTION OF THE PREFERRED EMBODIMENT

An embodiment of the present invention wherein a high mount stop lamp as a kind of an alarm lamp is attached to an upper part of a peripheral portion of a rear window glass at the outside of a vehicle will be described with reference to FIGS. 1 and 2. However, the present invention should not be limited to this embodiment.

Figure 1:
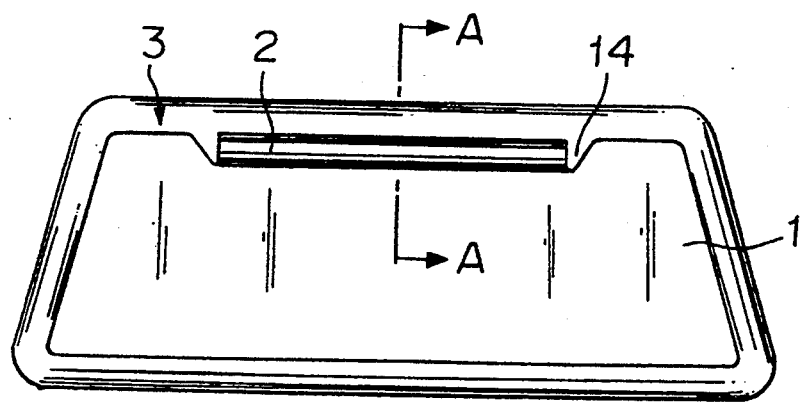
FIG. 1 is a front view showing an embodiment of the rear window structure with an alarm lamp for a vehicle according to the present invention.
Figure 2:
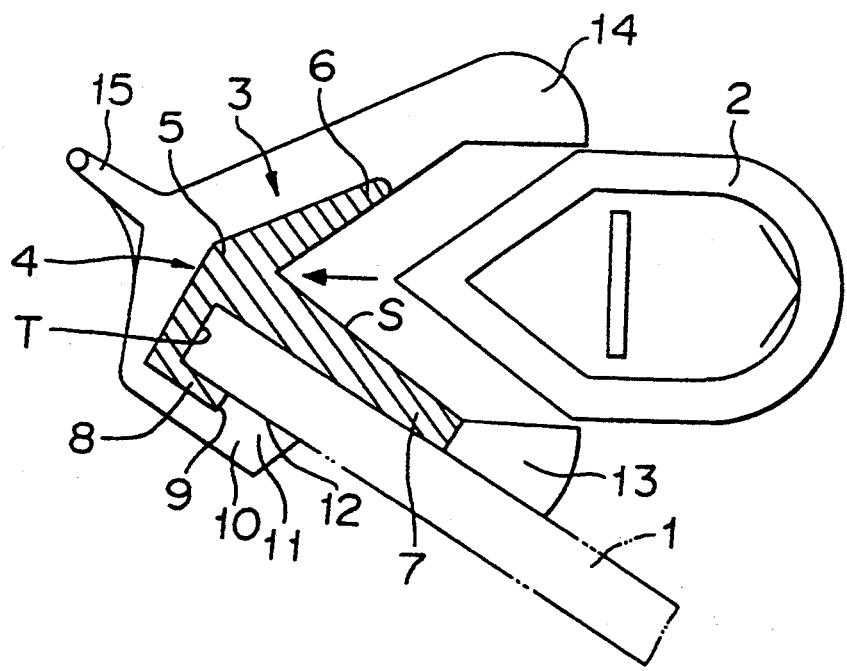
FIG. 2 is a cross-sectional view taken along a A—A line in FIG. 1.
Figure 3:
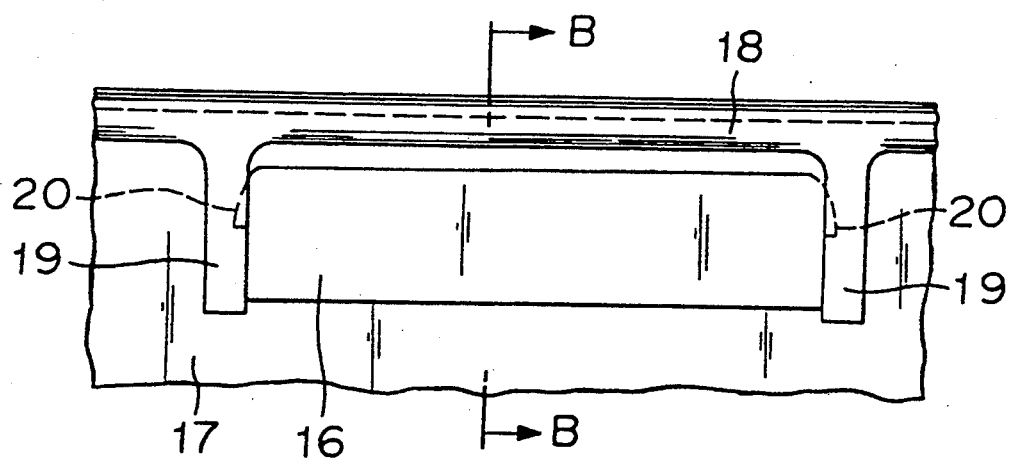
FIG. 3 is a front view showing a conventional rear window structure with an alarm lamp for a vehicle.
Figure 4:
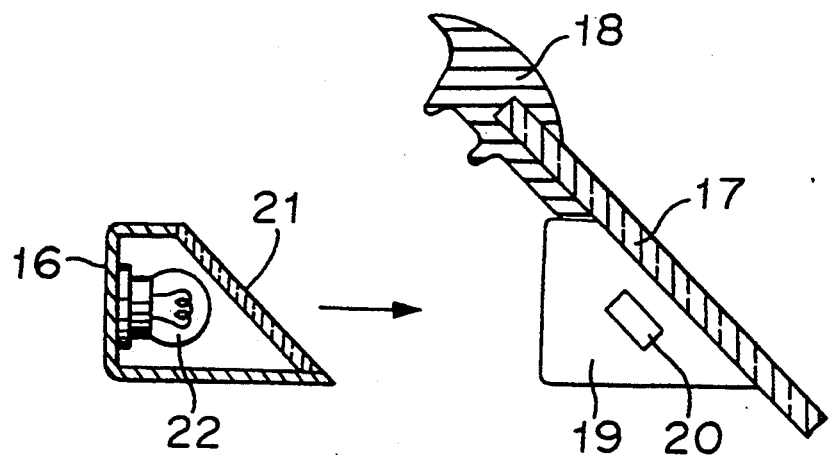
FIG. 4 is a cross-sectional view taken along a B—B line in FIG. 3.

FIG. 1 is a front view (viewed from a slightly upper direction) of a rear window with a high mount stop lamp for a vehicle, and FIG. 2 is an enlarged cross-sectional view taken along a line A—A in FIG. 1 which shows the detail of a portion to which the stop lamp is attached.

In FIGS. 1 and 2, a reference numeral 1 designates a glass sheet as an element of a rear window material; numeral 2 designates a stop lamp; numeral 3 designates a gasket; and numeral 4 designates a holding member which is secured by the glass sheet 1 and which receives and holds the stop lamp 2.

Reference numeral 5 designates a main body portion of the holding member 4; numeral 6 designates an upper band-like portion extending from the main body portion 5 in the upper right direction in FIG. 2; numeral 7 designates an intermediate band-like portion extending in a tongue form from an intermediate portion of the main body portion 5 in the lower right direction in FIG. 2; and numeral 8 designates a lower band-like portion extending in an L- letter form in cross-section from the main body portion 5 in the downward direction. These portions are made of the same material and formed integrally with each others.

In the holding member 5, a space portion in a cannel-like form in cross-section, which is formed between the intermediate band-like portion 7 and the lower band-like portion 8, constitutes a fitting portion T as a glass sheet fitting portion which receives therein an upper peripheral edge portion of the glass sheet 1. A space portion formed by the upper band-like portion 6 and the intermediate band-like portion 7, which opens toward the outside of the vehicle, constitutes a lamp holding portion S which receives and holds the stop lamp 2.

In this embodiment, the shape of the lamp holding portion S is in a V-like shape in cross-section. However, an appropriate shape may be formed depending on the shape of the stop lamp 2 to be received in the lamp holding portion 2 and a manner of holding the stop lamp 2.

A portion of the gasket 3, which faces the holding member 4, is in contact with an upper front surface of the main body portion 5; an upper front surface of the upper band-like portion 6 and a surface portion of the lower band-like portion 8 of the holding member 4 respectively. Accordingly, that portion of the gasket 3 facing the holding member 4 has a recessed shape corresponding to these front surface portions the abovementioned elements of the holding member 4.

The gasket 3 has a downwardly extending portion 10 which is provided with a projection 11 at its end portion so that the projection 11 is in contact with the edge portion 9 of the lower band-like portion 8 of the holding member 4 to grip the end portion 9. Further, the upper surface portion 12 of the projection 11 faces the surface of an upper peripheral portion of the glass sheet 1 and is bonded thereto. In addition, a portion of the gasket is in contact with the edge surface of the intermediate band-like portion 7 of the holding member 4 and an upper surface of the glass sheet 1 in the vicinity of the edge surface of the intermediate band-like portion 7 and bonded thereto, as indicated by numeral 13. Further, a portion of the gasket 3 is in contact with a lower surface of the stop lamp 2.

Thus, with the above-mentioned structure of the holding member 4, the holding member 4 is firmly secured by the glass sheet 1, while it holds the stop lamp 2, and supports supplemetarily and reinforces the gasket 3.

The portion indicated by numeral 15 is a part of the gasket 3 in the same manner as in the portions indicated by the numerals 10, 11, 13 and 14 in FIG. 2, which is in contact with a rear frame of the vehicle and has a shape fittable to an edge portion of the opening of the frame.

Material used for the gasket 3 is not particularly limited but a synthetic resin material such as polyvinylchloride, an ethylene-vinyl acetate copolymer or the like may be used as far as it is suitable for sealing and bonding an edge portion of the opening of the rear frame of a vehicle and a glass sheet 1.

The upper front surface portion of the gasket is usually exposed outside air and suffers a strong wind pressure in the driving. In the conventional technique, wherein a stop lamp is disposed on the front surface of a rear portion of the rear trunk lid of a vehicle, it was necessary to mount an air spoiler to cover the stop lamp in order to reduce the influence of the wind pressure, as described before.

In the present invention, on the other hand, the upper portion of the gasket 3 is extended not only to the portion corresponding to the upper band-like portion 6 of the holding member 4 but is further extended longer beyond the width of the upper band-like portion 6 of the holding member 4. The further extended portion as an extending portion 14 is formed integrally with the gasket 3. The upper portion of the gasket 3 and the extending portion 14 continuous thereto can perform the role of an air spoiler. In other words, it can adjust an air stream at the rear part of the vehicle to thereby reduce an air resistance, and reduce the influence of a strong wind pressure during the driving. As a result, fuel cost for the vehicle can be reduced; the stop lamp is protected, and undesired problems such as an external force by a shock due to pressure of brush at the time of a washing the vehicle and atmospheric conditions such as wind, rain and so on can be minimized.

The material for the gasket 3 usually has elasticity and flexibility. Accordingly, it can not expect that the portion of the holding member 4 corresponding to the upper band-like portion 6 of the gasket 3 and the extending portion 14 have such function. In the present invention, however, the above-mentioned advantage can be obtained by firmly securing and supporting the holding member 4 by the glass sheet 1 and by supporting and reinforcing the portion of the gasket 3 corresponding to the upper band-like portion 6 and the extending portion 14 continuous to the portion of the gasket 3 by the aid of the holding member 4.

In assembling the above-mentioned three pieces of the structural elements, i.e. the gasket 3, the holding member 4 and the glass sheet 1, it is desirable to join simultaneously the structural elements at the time of molding the gasket 3 from the viewpoints of the bonding strength at the joining portions or sealing effect of the structural elements, convenience for shipping, and so on.

For molding the gasket 3, various methods such as a compression molding, an injection molding, a transfer molding or the like may be used. In particular, use of the injection molding is advantageous from the viewpoints of the inner shape of a shaping mold, i.e. a metal mold corresponding to the shape of the gasket 3, the flowability of the gasket 3, the nature of material for the gasket 3, workability and so on. In the injection molding, the following steps may be employed.

The glass sheet 1 is fitted to the glass sheet fitting portion T of the holding member 4 to prepare a one-piece body of the holding member 4 and the glass sheet 1 previously. Into metal molds having the shape corresponding to the shape of the gasket 3, the corresponding portion of the one-piece body of the glass sheet 1 and holding member 4 is put, and the portion is closed by the metal molds. Then, the material for the gasket 3 is injected into the cavity in the metal molds, the cavity being formed at a peripheral edge portion of the glass sheet 1 including the holding member 4. After the curing of the injected material, the metal molds are separated. The assembled one-piece body of the glass sheet 1 and the holding member 4 is fitted and bonded to the edge of the opening of the rear frame of a vehicle at a working site, whereby the rear window structure is attached to the vehicle.

When the glass sheet 1 and the holding member 4 are previously formed in one piece, an adhesive may be applied to the glass sheet fitting portion, or, the one-piece body may be formed at the time of molding the holding member 4.

As another method, the corresponding portions of the glass sheet 1 and the holding member 4 are put in metal molds having the shape corresponding to the shape of the gasket 3, and the metal molds are closed. Then, material for the gasket 3 is injected into a cavity formed in the metal molds, which is formed at the corresponding edge portion of each of the holding member 4 and the glass sheet 1. After the curing of the material, the metal molds are separated. Then, the assembled one-piece body of the glass sheet of the holding member 4 is attached to the edge portion of the opening of the rear frame of a vehicle at a working site for attaching the one-piece body to the vehicle.

As another method, into metal molds having the shape corresponding to the gasket 3, the portion of the holding member 4 corresponding thereto is put, and the metal molds are closed. Then, material for the gasket 3 is injected in a cavity in the metal molds. After the curing of the material, the metal molds are separated. Then, the glass sheet 1 is joined to the holding member 4 at a working site, and the assembled body is attached to the edge portion of the opening of the rear frame of a vehicle.

According to the rear window structure with an alarm lamp for a vehicle of the present invention, excellent bonding strength and sealing property can be maintained between the structural elements. In addition, the handling of the rear window structure in the preparation, the packaging, the shipping, the moving and the transporting of the assembly as well as the attaching the same at a working site can be significantly improved. In assembling the structural elements, the glass sheet 1, the holding member 4 and the gasket 3 may be separately prepared, and these elements may be assembled in a suitable order with use of an adhesive agent as required. Then, the stop lamp 2 is attached to the lamp holding portion S from the direction indicated by an arrow mark in FIG. 2. In a case of substituting the lamp 2, the lamp 2 is removed in the inverse direction of the arrow mark. The attachment and the removal of the stop lamp 2 can be easy since the holding member opens toward the outside of the vehicle. The attachment and the support of the stop lamp 2 can be done according to a generally used manner by using a clipping means, the fitting by means of projections and recesses formed in the lamp 2 and the holding member, and/or by using an adhesive agent.

The stop lamp 2 is attached to the holding member 4 from the outside of the vehicle body. Accordingly, the supply of electricity to the stop lamp 2 is conducted by extending a lead wire from a power feeding portion inside the vehicle body to the lamp holding portion S opened toward the outside of the vehicle body and by connecting the lead wire to the stop lamp. However, the method of feeding power is not limited to the above-mentioned but another method may be utilized.

According to the present invention having the above-mentioned structure, the effective space in the vehicle can be widened; the eyesight to the rear direction and the view in the cabin can be improved; the luminous intensity of the lamp can be small, and consumption of power can be substantially reduced in comparison with a case that an alarm lamp such as a stop lamp is located inside of the rear window of the vehicle.

In a case that the gasket is formed integrally with the glass sheet with the holding member, or both of the glass sheet and the holding member by an injection molding of the gasket, the bonding strength and sealing property of the structural elements can be assured. In addition, the handling of the assembly in the preparation, the packaging, the shipping, the moving and the transporting of the assembly as well as workability at a working site can be substantially improved.

Thus, in accordance with the present invention, since the upper portion of the gasket is extended to be longer than the width of the upper band-like portion of the holding member to form the extending portion which is formed integrally with the gasket, the structure performs the role of an air spoiler which covers the alarm lamp. Namely, an air stream in the rear portion of the vehicle can be adjusted and an air resistance can be reduced and influence by a wind pressure during the driving of the vehicle can be reduced. As a result, a fuel cost for the vehicle can be reduced; the alarm lamp is protected, and it is durable to an external force and outer atmospheric conditions such as wind and rain. In addition, there are advantageous of safetyness and cost in comparison with the conventional technique of providing the structural elements separately.

I claim:

1. A rear window structure with an alarm lamp for a vehicle which comprises:
   a gasket to be attached to a rear frame in a vehicle body,
   a rear window glass sheet, and
   a holding member provided with a glass sheet fitting portion and an alarm lamp holding portion, wherein
   the holding member is provided between the gasket and a peripheral edge portion of the glass sheet;
   the holding member is firmly secured by fitting the glass sheet to the glass sheet fitting portion;
   the alarm lamp holding portion is disposed on a side of said rear window glass sheet which is outside of said vehicle and said holding portion includes an opening which opens away from said rear window glass sheet and in a rearward direction relative to said vehicle when said rear window glass sheet is installed; and an alarm lamp is held by the alarm lamp holding portion in said opening.

2. The rear window structure according to claim 1, wherein the gasket is formed integrally with a peripheral edge portion of the glass sheet, and the holding member is fitted to and secured by the glass sheet fitting portion of the holding member.

3. The rear window structure according to claim 1, wherein the holding member and the gasket are formed integrally with and secured to a peripheral edge portion of the glass sheet when the gasket is molded.

4. A rear window structure with an alarm lamp for a vehicle which comprises:
 a rear window glass sheet to be attached to a rear frame in a vehicle body by means of a gasket, and
 a holding member provided with a glass sheet fitting portion and an alarm lamp holding portion, said alarm lamb holding portion disposed on a side of said rear window glass sheet which is outside of said vehicle and said holding portion includes an opening which opens away from said rear window glass sheet and in a rearward direction relative to said vehicle when said rear window glass sheet is installed, the holding member being provided between the glass sheet and the gasket,
 wherein the holding member is secured to a peripheral portion of the glass sheet by the glass sheet fitting portion, and
 an alarm lamp is attached by means of the alarm lamp holding portion of the holding member.

5. The rear window structure according to claim 4, wherein the gasket is formed integrally with a peripheral edge portion of the glass sheet, and the holding member is fitted to and secured by the glass sheet fitting portion of the holding member.

6. The rear window structure according to claim 4, wherein the holding member and the gasket are formed integrally with and secured to a peripheral edge portion of the glass sheet when the gasket is molded.

7. A rear window structure with an alarm lamp for a vehicle which comprises:
 a rear window glass sheet,
 a holding member provided with a glass sheet fitting portion and an alarm lamp holding portion, said alarm lamp holding portion disposed on a side of said rear window glass sheet which is outside of said vehicle and said holding portion includes an opening which opens away from said rear window glass sheet and in a rearward direction relative to said vehicle when said rear window glass sheet is installed,
 a gasket formed integrally with the holding member at a peripheral edge portion of the glass sheet, and
 an alarm lamp attached by means of the alarm lamp holding portion of the holding member.

8. A rear window structure with an alarm lamp for a vehicle comprising:
 a rear window glass sheet;
 a holding member including an upper band portion, an intermediate band portion and a lower band portion;
 said upper band portion and said intermediate band portion disposed on a side of said window glass sheet which is outside of said vehicle when said window glass sheet is installed, and wherein a spacing is provided between said upper band portion and said intermediate band portion such that an alarm lamp holding portion is defined between said upper band portion and said intermediate band portion, and wherein an alarm lamp is at least partially disposed and held in said alarm lamp holding portion, and further wherein said intermediate band portion is disposed between said window glass and said alarm lamp holding portion; and
 wherein said intermediate band portion and said lower band portion are spaced from one another and define a glass receiving portion therebetween, and wherein said rear window glass sheet is received in said glass receiving portion.

9. The rear window structure of claim 8, wherein said alarm lamp holding portion has a V-shaped cross-section.

10. The rear window of claim 8, further including a gasket which extends over said upper band portion and said lower band portion of said holding member.

11. The rear window structure of claim 10, wherein said gasket further includes portions in contact with said rear window glass sheet.

12. The rear window structure of claim 11, wherein said portions of said gasket in contact with said rear window glass sheet are adjacent said intermediate band portion of said holding member, and further wherein said portions of said gasket are disposed between said alarm lamp and said rear window glass sheet.

13. The rear window structure of claim 12, wherein said gasket extends over said upper band portion of said holding member and adjacent to said alarm lamp on an upper side of said alarm lamp.

14. The rear window structure of claim 10, wherein said gasket extends over said upper band portion of said holding member and adjacent to said alarm lamp on an upper side of said alarm lamp.

15. A rear window structure with an alarm lamp comprising:
 a rear window glass sheet including an inner surface, an outer surface, and an edge surface disposed between said inner and outer surfaces;
 a holding member at least partially disposed on said outer surface of said rear window glass sheet, said holding member including an alarm lamp holding portion, and wherein an alarm lamp is disposed in said alarm lamp holding portion; and
 a gasket extending at least partially over said holding member such that when said rear window structure is mounted on a vehicle said gasket is disposed between said holding member and a frame of the vehicle;
 wherein when viewed in cross-section at least one of said gasket and said holding member extends from said outer surface of said rear window glass, along said edge surface and to said inner surface.

16. The rear window structure of claim 15, wherein each of said gasket and said holding member extend from the outer surface of said rear window glass to the inner surface of the window glass, and wherein said holding member is disposed between said gasket and said rear window glass at least along said edge surface.

17. The rear window structure of claim 15, wherein said gasket includes an upper portion which extends beyond an extension of said holding member such that said upper portion of said gasket is adjacent an upper side of said alarm lamp.

18. The rear window structure of claim 15, wherein said gasket includes portions disposed between a lower side of said alarm lamp and said outer surface of said rear window glass sheet.

19. The rear window structure of claim 15, wherein said holding member includes an intermediate portion disposed between said alarm lamp and said outer surface of said rear window glass sheet, and further wherein said holding member extends from said intermediate portion along said edge surface of said rear window glass sheet and to a lower portion of said holding member, and wherein said lower portion of said holding member is adjacent said inner surface of said rear window glass sheet.

20. The rear window structure of claim 19, wherein said gasket extends over said lower portion of said holding member and into contact with said inner surface of said rear window glass sheet such that said gasket extends inside of said holding member on said inner surface of said rear window glass sheet with respect to a direction extending from a periphery of said rear window glass sheet to a center thereof.

21. The rear window structure of claim 20, wherein said gasket extends over an upper portion of said holding member and adjacent said alarm lamp.

22. The rear window structure of claim 21, wherein said gasket further includes a portion disposed between said alarm lamp and said outer surface of said rear window glass sheet.

* * * * *